Jan. 22, 1957   J. A. LASATER ET AL   2,778,164
PIPE CLEANING APPARATUS WITH NOVEL UP-ENDING WHEEL
Filed Oct. 20, 1955   9 Sheets-Sheet 1
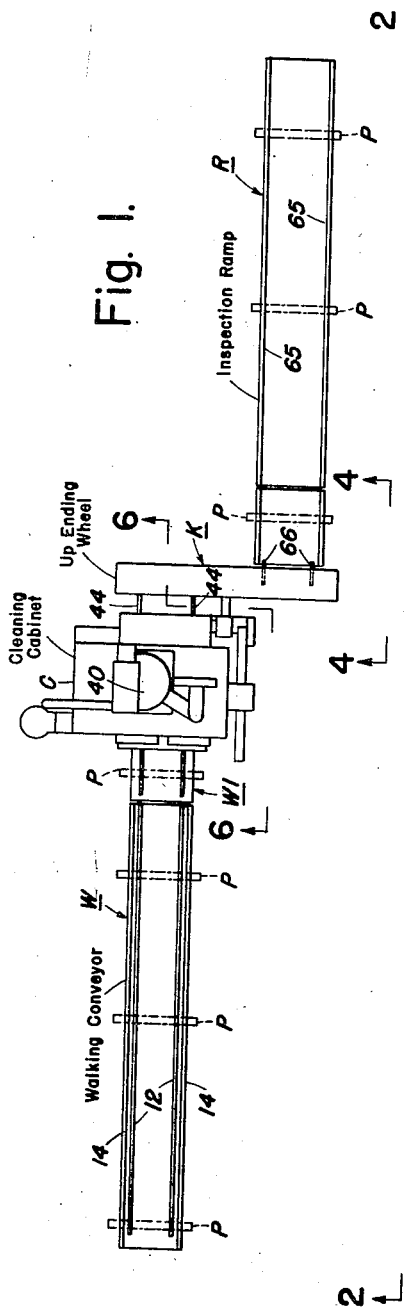
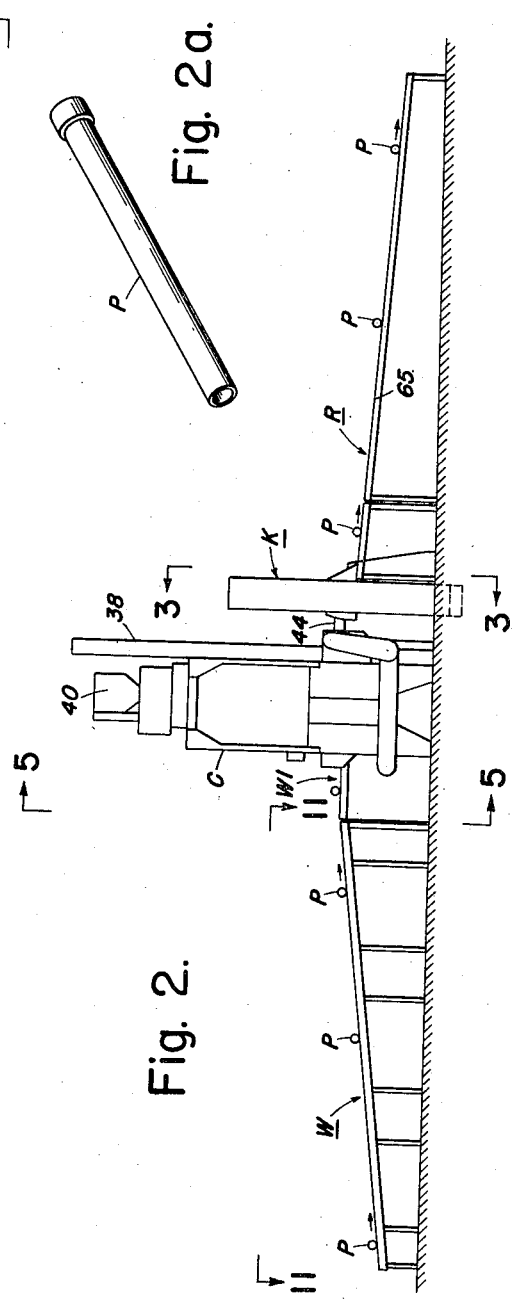
INVENTORS
John A. Lasater
Thomas A. Deakins
BY C. H. Bryant
ATTORNEY

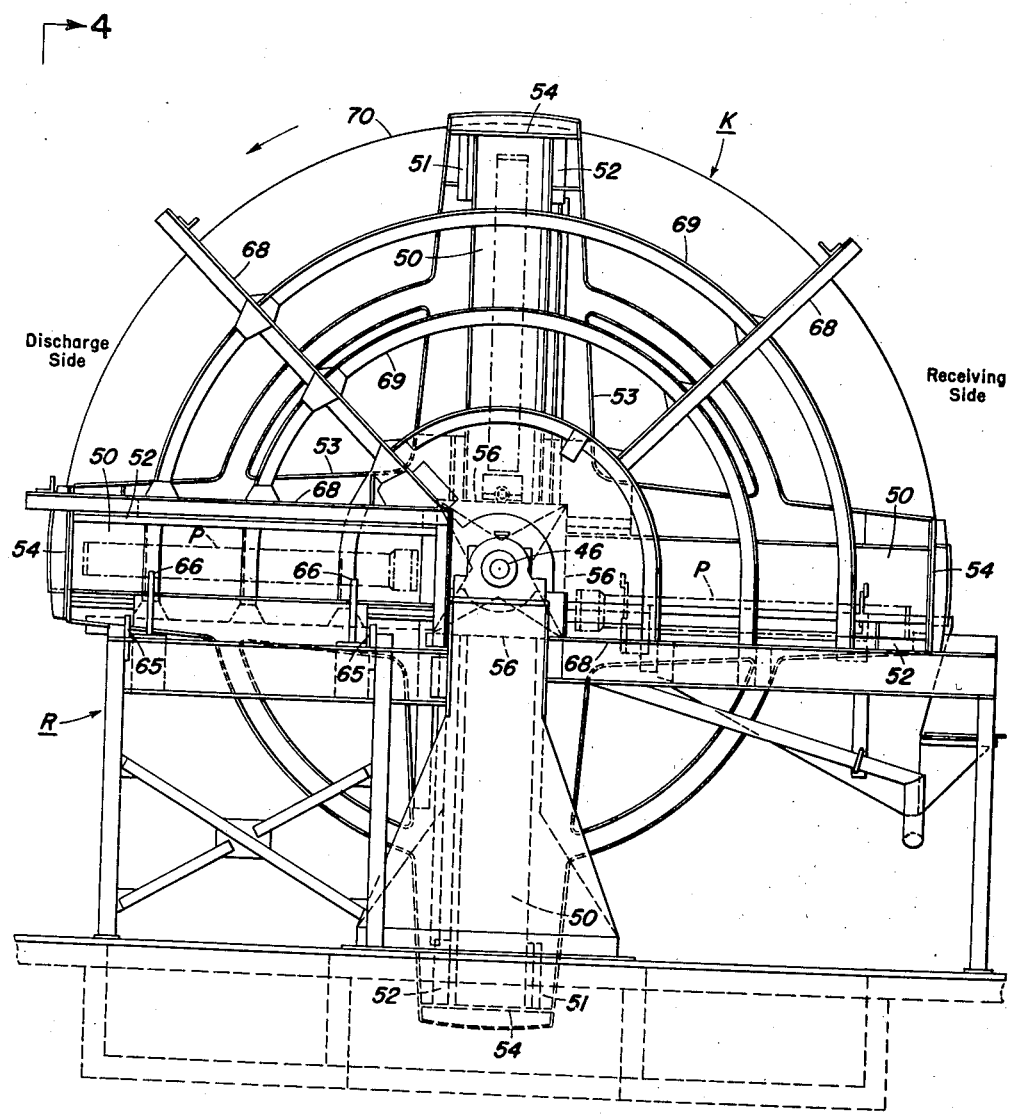

INVENTORS
John A. Lasater
Thomas A. Deakins

Jan. 22, 1957 J. A. LASATER ET AL 2,778,164
PIPE CLEANING APPARATUS WITH NOVEL UP-ENDING WHEEL
Filed Oct. 20, 1955 9 Sheets-Sheet 7
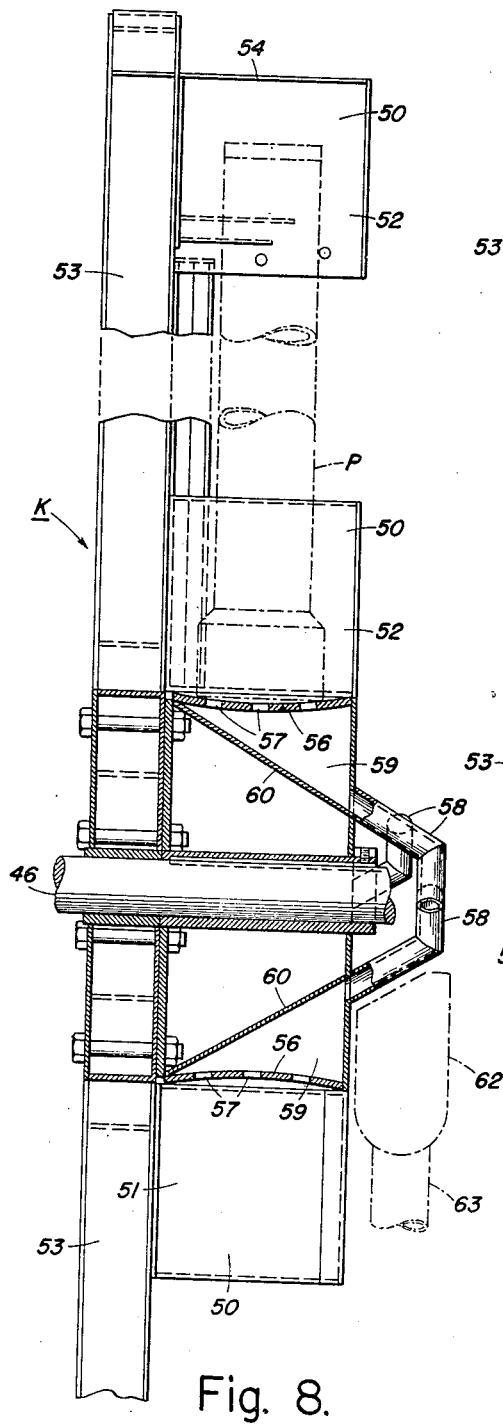
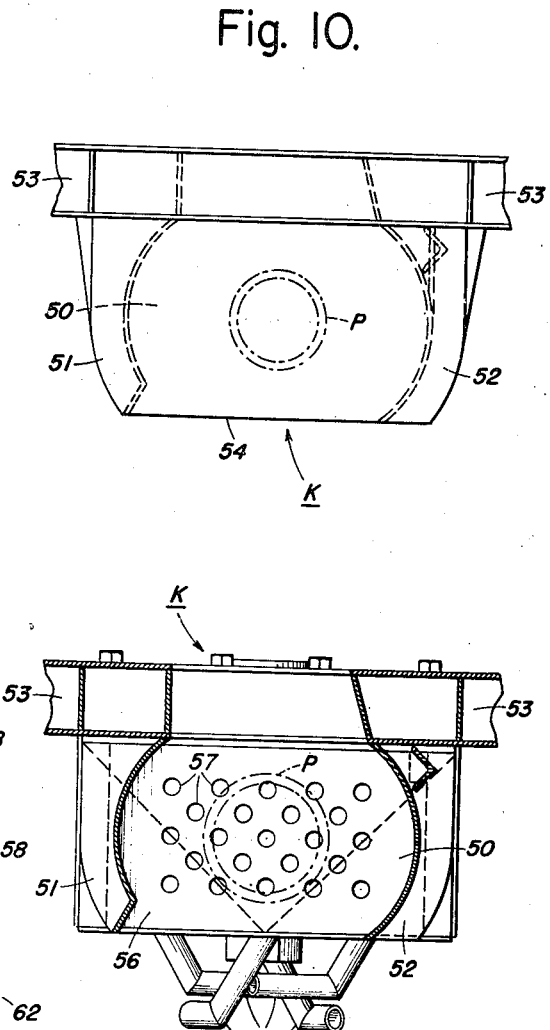
Fig. 10.
Fig. 9.
Fig. 8.
INVENTORS
John A. Lasater
Thomas A. Deakins
BY
ATTORNEY Jan. 22, 1957 J. A. LASATER ET AL 2,778,164
PIPE CLEANING APPARATUS WITH NOVEL UP-ENDING WHEEL
Filed Oct. 20, 1955 9 Sheets-Sheet 8

INVENTORS
John A. Lasater
Thomas A. Deakins

ATTORNEY

Jan. 22, 1957         J. A. LASATER ET AL         2,778,164
                PIPE CLEANING APPARATUS WITH NOVEL UP-ENDING WHEEL
Filed Oct. 20, 1955                                 9 Sheets-Sheet 9

INVENTORS
John A. Lasater
Thomas A. Deakins

BY
*R. F. Bryant*
ATTORNEY

United States Patent Office 2,778,164
Patented Jan. 22, 1957

2,778,164

PIPE CLEANING APPARATUS WITH NOVEL UP-ENDING WHEEL

John A. Lasater and Thomas A. Deakins, Chattanooga, Tenn., assignors to Combustion Engineering, Inc., New York, N. Y., a corporation of Delaware Application October 20, 1955, Serial No. 541,624

6 Claims. (Cl. 51—9)

This invention relates to the cleaning of pipe by the so-called "shot-blast" method and it has special reference to apparatus that is effective to clean molding sand and other foreign material from lengths of iron or other pipe as taken from the foundry apparatus wherein said pipe lengths have been cast from molten iron or other metal.

Broadly stated, the object of this invention is to provide improved facilities for removing from the inside of pipe lengths which have been cleaned by the shot-blast method such cleaning shot and other foreign material as may remain inside of each pipe length at the end of the cleaning operation.

A more specific object is to provide efficient mechanical means for retrieving from lengths of shot-blasted pipe the cleaning shot which is entrained therein, whereby said retrieved shot can be separated from sand and other foreign material and reused in the pipe cleaning cycle.

Another object is to supplement conventional shot-blast cleaning apparatus by novel means coordinated and integrated therewith in such way that each length of the cleaned pipe as discharged in horizontal position will be turned upwardly and over through a vertical position wherein the entrained shot and other foreign material can freely drop out of the open lower end of each pipe length which has thus been up-ended.

A further object is to accomplish the foregoing by the aid of a novel up-ending wheel provided with recessed spoke means each of which is adapted to receive a pipe length from the shot-blast cleaning facilities and to turn said length first into a vertical position for drainage of cleaning shot therefrom and then into a second horizontal position for delivery of the drained pipe length upon an inspection ramp.

Other objects and advantages will become apparent as the disclosure and description hereof proceeds.

One illustrative form of apparatus provided by us for practicing this invention is shown by the accompanying drawings wherein:

Fig. 1 is a top plan view of pipe cleaning apparatus which incorporates our inventive improvements and wherein a walking conveyor moves the pipe lengths successively through a shot-blast cleaning cabinet and thence into an up-ending wheel which is novelly organized to remove entrained shot from those cleaned pipe lengths and then to deliver them upon an inspection ramp;

Fig. 2 is a view in elevation from line 2—2 of Fig. 1 showing the pipe cleaning machine assemblage as viewed from one side;

Fig. 2a is a perspective view of one of the pipe lengths which the apparatus of Figs. 1–2 is adapted to clean by the shot-blast method and thereafter to recover cleaning shot from the inside thereof;

Fig. 3 is a view from line 3—3 of Fig. 2 showing our novel up-ending wheel in front elevation as viewed from the inspection ramp end of the cleaning machine;

Fig. 8 is a view in section on line 8—8 of Fig. 7 indicating our provision for collecting the entrained shot from each up-ended length of cleaned pipe into a collecting conduit which extends axially from the wheel;

Fig. 9 is a view on line 9—9 of Fig. 7 showing further details of the shot collecting and conveying means of Fig. 8;

Fig. 10 is a view from line 10—10 of Fig. 7 looking down on the top of one of the four "spoke" portions of our new up-ending wheel;

Figure 4:
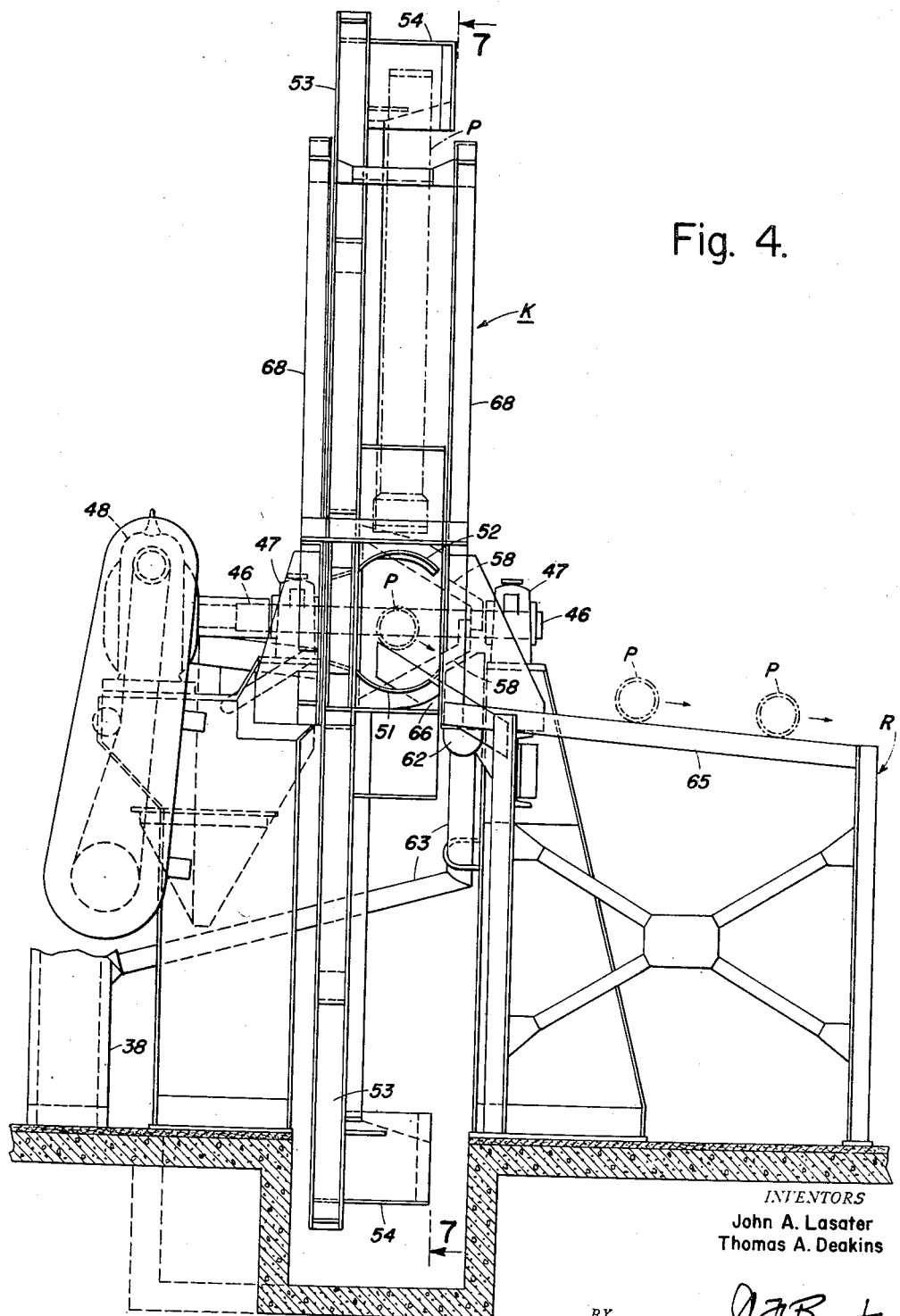
Fig. 4 is a view from line 4—4 of Fig. 1 showing the up-ending wheel in side elevation together with support elements and drive mechanism therefor plus a portion of the inspection ramp.

Referring to the drawings the apparatus there illustrated is adapted for "shot-blast" cleaning of lengths of pipe such as are represented at P in Figs. 1–2, 2a, 3, 4, 5, 6, 7, 8, 9, 10, 11 and 12. This pipe P may be formed from cast iron or other metal and the lengths thereof may be intended for soil pipe or other use. As received from the casting apparatus (not here shown) these pipe lengths P carry on their walls and in their ends certain quantities of molding sand and other foreign material all of which must be removed before the pipe is acceptable for shipment.

Removal of such adhering sand from these lengths of the cast pipe P can be effected by shot-blasting facilities of known type; and the improved pipe cleaning mechanism here illustrated utilizes such conventional facilities. These are installed in a cleaning cabinet designated C in the drawings hereof; and cooperating with said cabinet are walking conveyors W and W1 plus our novel up-ending wheel K plus an inspection ramp R.

Figures 11, 12:
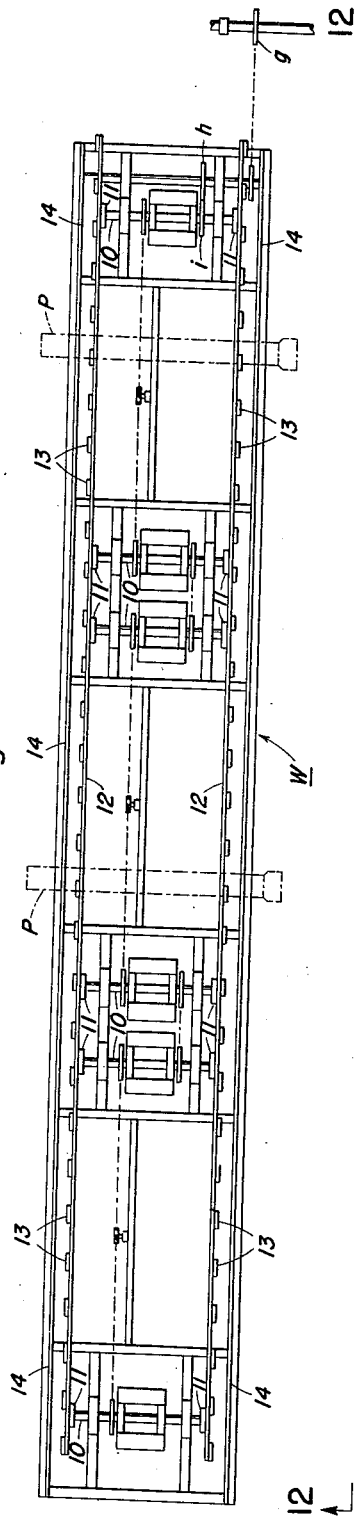
Fig. 11 is a view from line 11—11 of Fig. 2 showing how the walking conveyor portion of the complete Figs. 1–2 machine appears when viewed from the top.
Fig. 12 is a view from line 12—12 of Fig. 11 showing how the walking conveyor appears when viewed from the side.

Pipe in uncleaned state as received from the casting apparatus (not shown) is manually placed on the lower end of walking conveyor W in the horizontal-axis position shown at P at the extreme left of each of Figs. 1, 2 and 12. For a purpose later to become evident the enlarged shoulder end of said pipe length (shown at right by Fig. 2a) is preferably positioned at the right of conveyor W as viewed from the left in Figs. 1 and 11; this relationship also being clearly indicated by Fig. 11.

Under the driving action of a motor M conveyor W serves to move each pipe length P upwardly along the conveyor span (to the right in Figs. 1, 2, 11 and 12) in successive steps. Such "walking" movement is achieved through the medium of shafts 10 each of which is provided with end crank arms 11 that actuate and carry left and right side bars 12 (see Figs. 11–12) having upward projections 13 (also shown in Fig. 6). Said shafts 10 are rotated slowly (about 4 to 12 revolutions per minute being typical) by the aforesaid motor M via a speed reducer 17 and other drive elements designated a, b, c, d, e, f, g, h, i, and j in Figs. 13 and 14. The rate of the walking conveyor drive speed can suitably be adjusted in well known manner not here disclosed in detail.

With each rotation of shafts 10 and crank arms 11 (clockwise as viewed in Fig. 12) each length of pipe P on the conveyor W is advanced by elements 13 one step upwardly along the conveyor. Hence each of said rotations brings all pipe lengths P upon the succeeding supporting rack or ledge 15 that is formed in the left and right stationary side bars 14 of the conveyor structure. These pipe supporting ledges 15 have a slight downward inclination (to the right in Figs. 11–12) which causes the advanced pipe lengths P to remain on their newly deposited ledges during the succeeding rotation of the conveyor crank arms 11 and movable side elements 12.

In this way each length of pipe P placed on the lower end of the main conveyor W is advanced in successive steps therealong to the associated cleaning cabinet conveyor W1.

Figure 6:
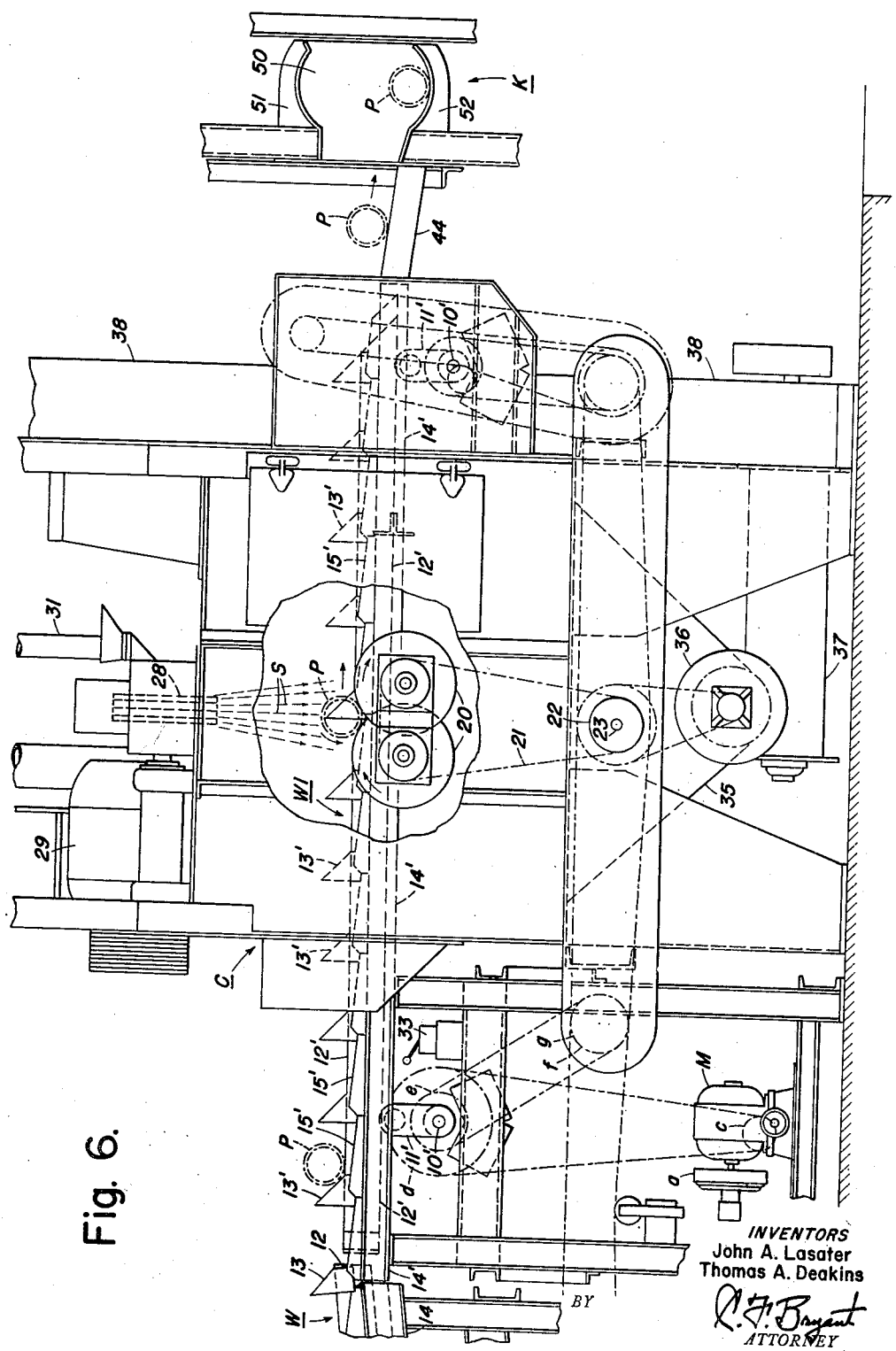
Fig. 6 is a view from line 6—6 of Figs. 1 and 5 showing the shot-blast cleaning cabinet as viewed from an end thereof and also showing the walking conveyor portion that extends through the cabinet and carries the cleaned pipe from the cabinet into the up-ending wheel.

Said shorter conveyor W1 is constructed in substantially the same manner as the main conveyor W just described except that it has no upward inclination and extends through the cleaning cabinet C at a horizontal level. As best shown in Fig. 6 it includes left and right stationary side bars 14' with ledge formations 15' together with cooperating walking bars 12' and protruding prong members 13'.

These walking side bars 12' of conveyor W1 are mounted upon crank arms 11' carried by shafts 10' that correspond to the similarly designated elements of the main conveyor W. Said shafts 10' are driven by the earlier mentioned motor M at the same speed as and in synchronism with the main conveyor drive members. The drive facilities utilized are diagrammed in Fig. 13 as including elements a, b, c, d, e, f, g, j, k, l, m and n.

Thus synchronized with the main conveyor W this cleaning cabinet conveyor W1 moves pipe lengths P through the cleaning cabinet S at the same speed and in the same timing as does the main conveyor W by which those pipe lengths are brought upon the left or entrance end (Fig. 6) of the cabinet conveyor.

Figure 5:
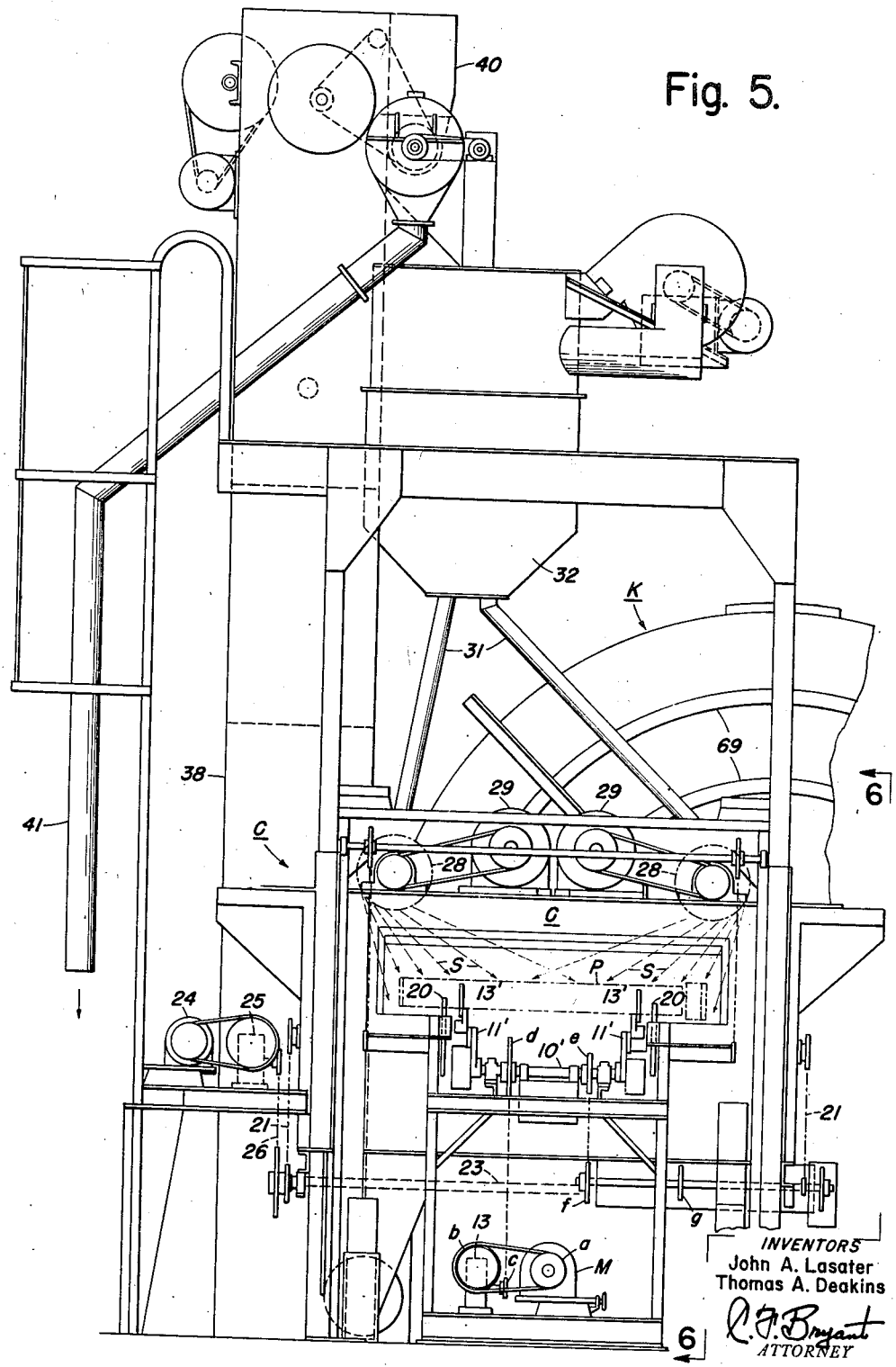
Fig. 5 is a view from line 5—5 of Fig. 2 showing the interior of the shot-blast cleaning cabinet as viewed along its length together with the shot feeding and shot cleaning apparatus thereabove and the pipe-rolling apparatus in the lower portion of the cabinet.

Within the cleaning cabinet C there are provided two pairs of pipe spinner wheels 20. One of these pairs is shown in Fig. 6 as resting beneath one end of a pipe length P; a second corresponding pair (not visible in Fig. 6 but indicated in Fig. 5) similarly supports the opposite end of the pipe length. Both pairs of these wheels 20 are driven at slow speed in any suitable manner, such as via a chain 21 and sprocket 22 mounted on shaft 23, which shaft also is shown in Fig. 5. In the arrangement represented rotative movement is imparted to said shaft 23 by a motor 24 through a speed reducer 25 and chain 26.

Each pipe length P as brought by conveyor W1 upon the spinner wheels 20 (Fig. 6), is slowly rotated by wheels 20 through at least one full revolution whereby all portions of the pipe exterior are brought in range of the blasts of cleaning shot designated by arrows S in Figs. 5 and 6. These blasts of shot are thrown downwardly against said pipe length by left and right shot-wheels represented at 28 in Figs. 5 and 6.

Said shot-wheels 28 are continuously driven at relatively high speed by motors shown at 29 in Fig. 5. They thus serve in conventional manner to impinge the cleaning shot upon the outside of each pipe length P that is supported on the spinner wheels 20 within cabinet C. The apparatus is organized so that said impingement continues during the full rotation of the pipe length; and the offset positioning of shot-wheels 28 with respect to the open ends of the pipe length causes some of the cleaning shot to be directed into the pipe interior via said open ends. Such impingement of the cleaning shot upon each length of pipe P being cleaned continues for about three seconds.

The cleaning shot is supplied to wheels 28 via conduits 31 from a bin or container shown at 32 in Fig. 5. Valve means (not shown) are so controlled by a switch shown at 33 in Fig. 6 that wheels 28 receive cleaning shot from conduits 31 when and only when a length of pipe P is positioned on spinner wheels 20 as represented in Fig. 6. Since this control feature is conventional no attempt is made to show details.

The shot S thus impinged upon each pipe length P to effect cleaning thereof in the manner aforesaid falls from the pipe length into a collecting hopper indicated at 35 in Fig. 6. From this hopper said shot together with the sand and other material removed from the pipe length is carried by conveyors 36 and 37 into the lower portion of an elevator 38. This elevator 38 is organized to carry said shot and sand upwardly into cyclone separator apparatus generally designated as 40 in Figs. 1, 2 and 5. Because such separator apparatus is conventional no attempt at detailed representation is here made.

Instead it will suffice to say that this cyclone apparatus 40 serves to separate the retrieved cleaning shot from the sand, dust and other foreign material with which it is initially mixed. Said separated sand and dust is discharged via conduit 41 in Fig. 5 and thus is gotten out of the system. But the cleaning shot from cyclone separator apparatus 40 is carried into the aforesaid bin or container 32 (see Fig. 5) for reuse in the cleaning of additional pipe lengths P delivered upon spinner wheels 20 within cabinet C.

In operation of the cleaning cabinet facilities just described, each advance by the walking conveyors W and W1 takes the previously cleaned pipe length P away from spinner wheels 20 in cabinet C and brings a length of uncleaned pipe P upon those spinner wheels as shown in Fig. 6. The cleaned pipe length is thus advanced one step to the right in Fig. 6; wherefore subsequent operations by the walking conveyors W and W1 further advance the aforesaid cleaned pipe length in step by step fashion completely through the cabinet C and out of the right side thereof.

Upon so leaving the cabinet C each cleaned pipe length P is thus moved still further to the right (again see Fig. 6) upon laterally spaced inclined bars shown at 44 in Figs. 1, 2 and 6. Gravity thereupon carries each such pipe length P further away (to the right in Fig. 6) from cabinet C and into one of the recessed spoke means of our novel up-ending wheel K.

Said up-ending wheel K is shown by Figs. 3, 4, 7, 8, 13 and other drawing views. In the illustrative form here shown this wheel is mounted on a horizontally disposed shaft 46 that is rotatably carried in bearings 47 (see Fig. 4) and driven at a constant speed by the aforesaid motor M through the medium of a device 48 and the cooperating elements diagrammatically represented in Fig. 13.

Figures 13, 14:
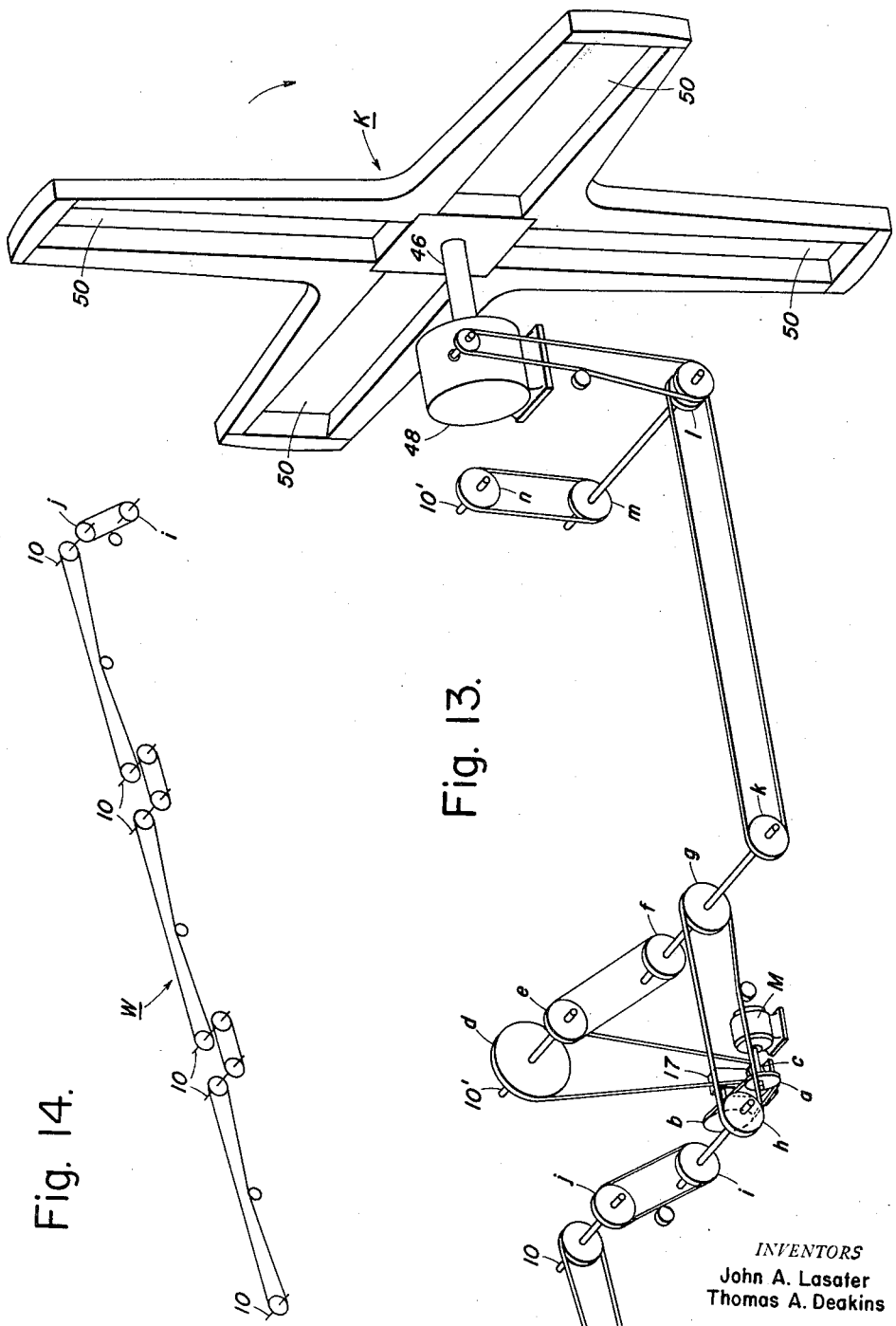
Fig. 13 is a diagrammatic representation of the drive mechanism for the cleaning machine's up-ending wheel and other parts.
Fig. 14 extends the drive diagram of Fig. 13 to the walking conveyor shown by Figs. 11–12.

From Fig. 13 it will be seen that such drive facilities for up-ending wheel K are synchronized with the cooperating drive facilities for the walking conveyors W and W1. Said synchronization is such that one of the four recessed wheel spokes 50 is in position of horizontal alignment with the aforesaid inclined bars 44 each time that one of the cleaned pipe lengths P rolls down said bars out of the cleaning cabinet C. Such position of alignment is represented by each of Figs. 3 and 6.

Stated in another way, the cleaning cabinet conveyor W1 causes a cleaned length of pipe P to roll down inclined bars 44 at the exact time that one of the spokes 50 of up-ending wheel K has the particular position represented by Figs. 3 and 6. This means that wheel K rotates through 90 degrees between successive advance movements of the walking conveyors W1 and W.

Up-ending wheel K can of course be provided with either a greater or a lesser number of spokes 50 than the four which are here represented. Each of these spokes 50 is adapted to receive within the recess thereof the length of cleaned pipe P which rolls by gravity down inclined bars 44 as shown in Fig. 6. To this end each of said spokes is open both at the front and at the rear and includes two pairs of substantially identical side members 51 and 52.

Figure 7:
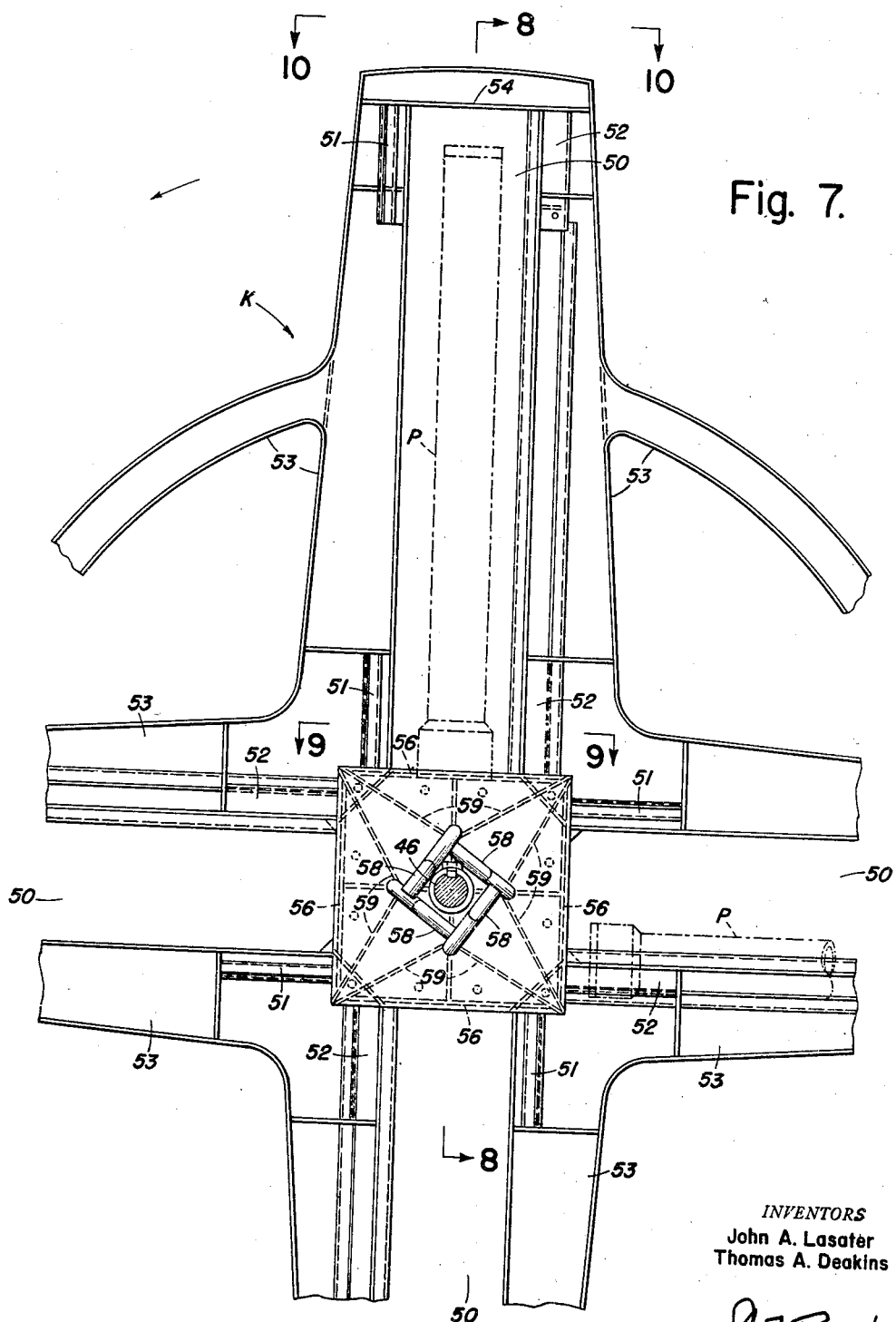
Fig. 7 is a view on line 7—7 of Fig. 4 showing further details of our new up-ending wheel as viewed from the front end of the cleaning machine.

In the instance of each of these four spokes 50 the first of these member pairs 51—52 is disposed near the wheel hub or center; the second of such pairs is disposed near the wheel periphery or outer edge; and both of said member pairs 51—52 are secured to and supported by a rear framework designated as 53 in each of Figs. 3, 4, 7, 8, 9 and 10. This wheel frame structure 53 is keyed to shaft 46 and otherwise organized with the remaining wheel elements as indicated by Figs. 7 and 8. The outer elements 51—52 of each recessed spoke are interconnected by an end plate 54; those outer members 51—52 are secured to the wheel framework 53 in any suitable manner as by welding or bolts, as are likewise the inner members 51—52 of each wheel spoke; and the entire assemblage is thus held together strongly and rigidly.

At the center or hub of up-ending wheel K there is positioned a box formed of four perforated plates shown at 56 in each of Figs. 3, 7, 8 and 9. Each of these plates has a plurality of perforations 57 (see Figs. 8–9) each of which perforations is sufficiently large to pass individual pellets of the cleaning shot earlier described and generally designated S in Fig. 5. Fragments of sand and other foreign material falling out of the pipe length P also can pass through these plate perforations 57 into the interior of the box structure 56.

Inside said box structure 56 there are disposed four collecting chambers that respectively terminate in four discharge pipes designated 58 in each of Figs. 4, 7, 8 and 9. Each of these four pipes 58 leads from the aforesaid chamber beneath an associated perforated plate 56. Each of said chambers in turn is formed in part by inclined baffles 59 (see Fig. 7) and in remaining part by cooperating baffles 60 (see Fig. 8).

Purpose of this organization is to collect from each length of up-ended pipe P (see Fig. 7) all of the cleaned shot and sand and foreign material that drains out of that pipe length and passes through perforated plate 56 therebeneath, with such collected material being directed by the chamber boundaries 59—60 into the associated outlet or discharge pipe 58. This happens in the case of each pipe length P which has been rotated by wheel K through 90 degrees from the horizontal into the vertical position.

Figs. 8 and 9 indicate that the aforesaid discharge pipes 58 project beyond the front boundary of the wheel structure K. This projecting relation permits the positioning beneath those discharge pipe ends of a shot and sand collecting cup designated as 62 in Figs. 4 and 8. With this arrangement all shot, sand and other foreign material draining from each up-ending pipe length P is carried by associated pipe 58 into the open end of collecting cup 62. From that cup the shot and sand passes downwardly by gravity through a conduit shown at 63 in Fig. 4 and thence into the earlier described elevator 38.

Once in this elevator the shot and sand are carried upwardly to a cyclone cleaning equipment 40 at the top of the installation (see Fig. 5). Here as already described the sand and other foreign material is separated from the shot and that shot thus cleaned is repassed from apparatus 40 into the shot bin or container shown at 32 in Fig. 5. Efficient reuse of the shot thus reclaimed from the cleaning pipe interiors thus becomes possible along with the other shot collected in bin 35 beneath cleaning cabinet C.

In rotating from the pipe pick up position opposite the outlet of cleaning cabinet C through 180 degrees to the opposite side of shaft 46 the up-ending wheel K carries each length of cleaned pipe P through the aforementioned vertical or up-ended position and then again lowers each pipe length to a second horizontal position at the entrance end of inspection ramp R. The direction of such wheel rotation is counter-clockwise (see arrows) as viewed from the front in Figs. 3 and 7 and clockwise as viewed from the rear in diagrammatic Fig. 13.

Said inspection ramp R consists of spaced and downwardly inclined top bars 65 on which each length of cleaned pipe P is released and rolls by gravity down the bar slope or to the right as shown in Fig. 4. Extending from the inspection ramp framework part way into the up-ending wheel K are a pair of inclined pick up bars shown at 66 which bars engage with the bottom of each pipe length P that is brought by up-ending wheel K from the cleaning cabinet C to the inspection ramp R. Upon such engagement the pipe length P is restrained from following the rotative movement of the wheel spoke 50 and gravity acting in conjunction with the bar inclination then moves the pipe length P out of the confines of wheel K and upon the inspection bars 65. Such movement frees the wheel spoke 50 for reception of another cleaned pipe length P when the spoke has further advanced through another 180 degrees of wheel rotation.

Serving to shield the upper half of up-ending wheel K on both the front face and the rear face are guard members which function to keep each length of cleaned pipe P received by the wheel from falling out of the wheel during the 180 degree rotative movement from the receiving or cleaning cabinet side to the opposite or discharge side of the wheel at the inspection ramp. The illustrative arrangement shown utilizes a first series of radially disposed angle irons 68 at the front side of the wheel (see Fig. 3) and a second series of similarly disposed angle irons 68 at the rear of the wheel (see Fig. 4). These in cooperation with semicircular lengths of other angle irons 69 (again see Fig. 3) constitute front and rear facing means for the entire upper portion of the up-ending wheel K. Preferably this angle iron structure is supplemented by flat screen members or perforated plates the outer boundary of which is indicated at 70 in Fig. 3.

With this shielding arrangement the lengths of pipe P carried by the wheel spokes 50 are held within the wheel confines during the entire range of 180 degree rotative travel from the cleaning cabinet C to the inspection ramp R.

How the complete system incorporating our improvements operates will become more or less apparent from the foregoing description of the various components, devices and parts which make up that system; and for this reason little detailed repetition of such operation is deemed necessary.

It will therefore suffice to observe that lengths of uncleaned pipe P placed upon the entrance end of walking conveyor W (extreme left in Figs. 1, 2, 11, 12) are successively advanced into and through the cleaning cabinet C by the associated walking conveyor W1. Each pipe length remains within cabinet C for a sufficient time to have sand and other foreign material shot blasted therefrom. Upon leaving the cabinet each cleaned length of pipe passes into one of the recessed spokes 50 of our novel up-ending wheel K. Rotation of this wheel is so synchronized with the operation of walking conveyors W—W1 that one of said recessed wheel spokes 50 is in register with the cleaning cabinet outlet each time that a pipe length P is discharged therefrom.

Each said cleaned pipe length thus rolls into one of the wheel spokes and is carried thereby from the horizontal receiving position first into the vertical position and then on into a second horizontal position at the entrance of inspection ramp R. As each pipe length thus moves into the vertical position all cleaning shot and sand entrained inside thereof drains out by gravity into the collecting box 56 at the wheel center. From the box said drained shot and sand is conveyed via bin 62 into the elevator 38 for transportation thereby into the shot cleaning cyclone apparatus 40 at the installation top. Here the shot is separated from the sand and other foreign material and thus having been cleaned is directed into the shot bin 32 for reuse in shot-blasting subsequent lengths of pipe P.

As each thus-drained length of cleaned pipe P is delivered by up-ending wheel K to inspection ramp R it is withdrawn from the wheel by inclined bars 66 and rolls by gravity upon the top surface 65 of the ramp. This completes the operating cycle of our improved pipe cleaning apparatus with novel up-ending wheel.

The technique and facilities herein disclosed have practical utility of a high order and the specific up-ending wheel and shot reclaiming facilities described therefor are accordingly to be interpreted in an illustrative rather than in a restrictive sense.

Our inventive improvements are therefore extensive in their adaptation and hence are not to be restricted to the specific form here disclosed by way of illustration.

What we claim is:

1. In a pipe cleaning installation comprising shot-blasting apparatus which receives individual lengths of pipe to be cleaned and which impinges blasts of cleaning shot upon and into each received pipe length while supporting the length in substantially horizontal-axis position, and conveyor means which discharges each shot blasted pipe length from said blasting apparatus via a discharge side thereof with the pipe axis still horizontal and with a quantity of cleaning shot within the pipe interior, the combination of an up-ending wheel at said discharge side of the shot-blasting apparatus there mounted for rotation about a generally horizontal axis and in a generally vertical plane that is substantially parallel to the aforesaid horizontal positioning of each discharged pipe length, said up-ending wheel having a plurality of recessed spokes and being disposed so that rotation of the wheel brings those spokes into successive register with the aforesaid discharge side of the shot-blasting apparatus, each of said spokes being adapted when in said position of register to receive from the blasting apparatus via said conveyor means a length of said shot-blasted pipe having its axis still horizontal and with cleaning shot still inside thereof, drive means for said up-ending wheel and for said conveyor means effective to rotate the wheel spokes upwardly past said shot-blasting apparatus and synchronized to time each discharge of a cleaned pipe length from said blasting apparatus with registration of one of said wheel spokes with the blasting apparatus discharge side, and collector means associated with the hub of said up-ending wheel for receiving the aforesaid quantity of cleaning shot which drains by gravity from each length of cleaned pipe that during rotation of the wheel is moved by a carrying spoke into the vertical up-ended position.

2. In pipe cleaning mechanism, the combination of shot-blasting apparatus which is adapted to receive individual lengths of the pipe to be cleaned and to support each length in substantially horizontal-axis position and to impinge blasts of cleaning shot upon and into each pipe length so supported, a walking conveyor effective to bring each length of said pipe to be cleaned into said horizontal-axis position within the blasting apparatus and thereafter to discharge each shot-blasted pipe length from said apparatus via discharge side thereof with the pipe axis still horizontal and with a quantity of cleaning shot within the pipe interior, an up-ending wheel mounted at said discharge side of the shot-blasting apparatus for rotation about a generally horizontal axis and in a generally vertical plane that is substantially parallel to the aforesaid horizontal positioning of each discharged pipe length, said up-ending wheel having a plurality of recessed spokes and being disposed so that rotation of the wheel brings those spokes into successive register with the aforesaid discharge side of the shot-blasting apparatus, each of said spokes being adapted when in said position of register to receive from the blasting apparatus via said walking conveyor a length of said shot blasted pipe having its axis still horizontal and with cleaning shot still inside thereof, drive means for said up-ending wheel and for said walking conveyor effective to rotate the wheel spokes upwardly past said shot blasting apparatus and synchronized to time each discharge of a cleaned pipe length from said blasting apparatus with registration of one of said wheel spokes with the blasting apparatus discharge side, and collector means associated with the hub of said up-ending wheel for receiving the aforesaid quantity of cleaning shot which drains by gravity from each length of cleaned pipe that during rotation of the wheel is moved by a carrying spoke into the vertical up-ended position.

3. In combination, shot-blasting apparatus adapted to receive individual lengths of pipe to be cleaned and while supporting each received pipe length in substantially horizontal-axis position to impinge blasts of cleaning shot thereupon and thereinto, conveyor means arranged to bring each length of said pipe to be cleaned into said horizontal-axis position within the blasting apparatus and thereafter to discharge each shot-blasted pipe length from said apparatus via a discharge side thereof with the pipe axis still horizontal and with a quantity of cleaning shot within the pipe interior, an up-ending wheel mounted at said discharge side of the shot-blasting apparatus for rotation about a generally horizontal axis and in a generally vertical plane that is substantially parallel to the aforesaid horizontal positioning of each discharged pipe length, said up-ending wheel having a plurality of recessed spokes and being disposed so that rotation of the wheel brings those spokes into successive register with the aforesaid discharge side of the shot-blasting apparatus, each of said spokes being adapted when in said position of register to receive from the blasting apparatus via said conveyor means a length of said shot-blasted pipe having its axis still horizontal and with cleaning shot still inside thereof, drive means for said up-ending wheel and for said conveyor means effective to rotate the wheel spokes upwardly past said shot blasting apparatus and synchronized to time each discharge of a cleaned pipe length from said blasting apparatus with registration of one of said wheel spokes with the blasting apparatus discharge side, collector means at the center of said up-ending wheel for receiving the aforesaid quantity of cleaning shot which drains by gravity from each length of cleaned pipe that during rotation of the wheel is moved by a carrying spoke into the vertical up-ended position, and facilities for taking from said collector means at the up-ending wheel center the aforesaid cleaning shot there received from each length of up-ended pipe and for returning said received shot to said pipe blasting apparatus for reuse therein.

4. In a pipe cleaning installation, the combination of a pipe up-ending wheel mounted for rotation about a substantially horizontal axis and having a plurality of recessed spokes each of which is shaped to receive and carry a length of pipe therewithin, shot-blasting apparatus positioned along the portion of one face of said wheel which is at a given side of the wheel axis and having a discharge side which abuts said wheel face and from which lengths of cleaned pipe can in horizontal position be discharged from said apparatus into said recessed wheel spokes, said blasting apparatus being adapted to receive individual lengths of pipe to be cleaned and to impinge blasts of cleaning shot upon and into each received pipe length while supporting the length in substantially horizontal-axis position, conveyor means for discharging each shot blasted pipe length from said blasting apparatus via said discharge side thereof with the pipe axis still horizontal and with a quantity of cleaning shot within the pipe interior, drive means for said up-ending wheel and for said conveyor means effective to rotate the wheel spokes upwardly past said shot blasting apparatus and synchronized to time each said discharge of a cleaned pipe length with positional registration of one of said wheel spokes with the blasting apparatus discharge side whereby each length of cleaned pipe discharged as aforesaid passes into the recess of a registering wheel spoke, and collector means associated with the hub of said up-ending wheel for receiving the aforesaid quantity of cleaning shot which drains by gravity from each length of cleaned pipe that during rotation of the wheel is moved by a carrying spoke into the vertical up-ended position.

5. In pipe cleaning mechanism, the combination of shot-blasting apparatus arranged to receive individual lengths of pipe to be cleaned and to impinge blasts of cleaning shot upon and into each received pipe length while supporting the length in substantially horizontal-axis position, conveyor means effective to discharge each shot blasted pipe length from said shot blasting apparatus via a discharge side thereof with the pipe axis still horizontal and with a quantity of cleaning shot within the pipe interior, an up-ending wheel at said discharge side of the shot blasting apparatus there mounted for rotation about a generally horizontal axis and in a generally vertical plane that is substantially parallel to the aforesaid horizontal positioning of each discharged pipe length, said up-ending wheel having a plurality of recessed spokes and being disposed so that rotation of the wheel brings those spokes into successive register with the aforesaid discharge side of the shot-blasting apparatus, each of said spokes being adapted when in said position of register to receive from the blasting apparatus via said conveyor means a length of said shot blasted pipe having its axis still horizontal and with cleaning shot still inside thereof, drive means for said up-ending wheel and for said conveyor means effective to rotate the wheel spokes upwardly past said shot blasting apparatus and synchronized to time each discharge of a cleaned pipe length from said blasting apparatus with registration of one of said wheel spokes with the blasting apparatus discharge side, collector means associated with the hub of said up-ending wheel for receiving the aforesaid quantity of cleaning shot which drains by gravity from each length of cleaned pipe that is moved by a carrying spoke into the vertical up-ended position during rotation of the wheel, and means including an inspection ramp at the side of said up-ending wheel opposite said shot-blasting apparatus disposed and arranged to receive from the wheel's said recessed spokes each length of said cleaned pipe which has been up-ended and drained of shot as aforesaid and then further advanced by the wheel into a second horizontal position in register with the inspection ramp.

6. In a pipe cleaning installation, the combination of a pipe up-ending wheel mounted for rotation about a substantially horizontal axis and having a plurality of recessed spokes each of which is shaped to receive and carry a length of pipe therewithin, shot-blasting apparatus positioned along the portion of one face of said wheel which is at a given side of the wheel axis and having a discharge side which abuts said wheel face and from which lengths of cleaned pipe can in horizontal position be discharged from said apparatus into said recessed wheel spokes, said blasting apparatus being adapted to receive individual lengths of pipe to be cleaned and to impinge blasts of cleaning shot upon and into each received pipe length while supporting the length in substantially horizontal-axis position, conveyor means for discharging each shot blasted pipe length from said blasting apparatus via said discharge side thereof with the pipe axis still horizontal and with a quantity of cleaning shot within the pipe interior, drive means for said up-ending wheel and for said conveyor means effective to rotate the wheel spokes upwardly past said shot blasting apparatus and synchronized to time each said discharge of a cleaned pipe length with positional registration of one of said wheel spokes with the blasting apparatus discharge side whereby each length of cleaned pipe discharged as aforesaid passes into the recess of a registering wheel spoke, collector means at the center of said up-ending wheel for receiving the aforesaid quantity of cleaning shot which drains by gravity from each length of cleaned pipe that during rotation of the wheel is moved by a carrying spoke into the vertical up-ended position, and an inspection ramp positioned along the portion of a face of said up-ending wheel which is at the side of said wheel axis opposite from said given or shot-blasting apparatus side, said inspection ramp being disposed and arranged to receive from the wheel's said recess spokes each length of said cleaned pipe which has been up-ended and drained of shot as aforesaid and then further advanced by the wheel into a second horizontal position in register with the ramp.

References Cited in the file of this patent

UNITED STATES PATENTS

| | | |
|---|---|---|
| 2,154,843 | Hammell | Apr. 8, 1939 |
| 2,160,697 | Hanren | May 30, 1939 |
| 2,343,357 | Zimmerman | Mar. 7, 1944 |
| 2,686,991 | Powell et al. | Aug. 24, 1954 |
| 2,692,458 | Lawrence | Oct. 26, 1954 |